No. 709,934. Patented Sept. 30, 1902.
G. SPENCE.
BICYCLE SPROCKET AND CRANK.
(Application filed July 18, 1901.)
(No Model.)
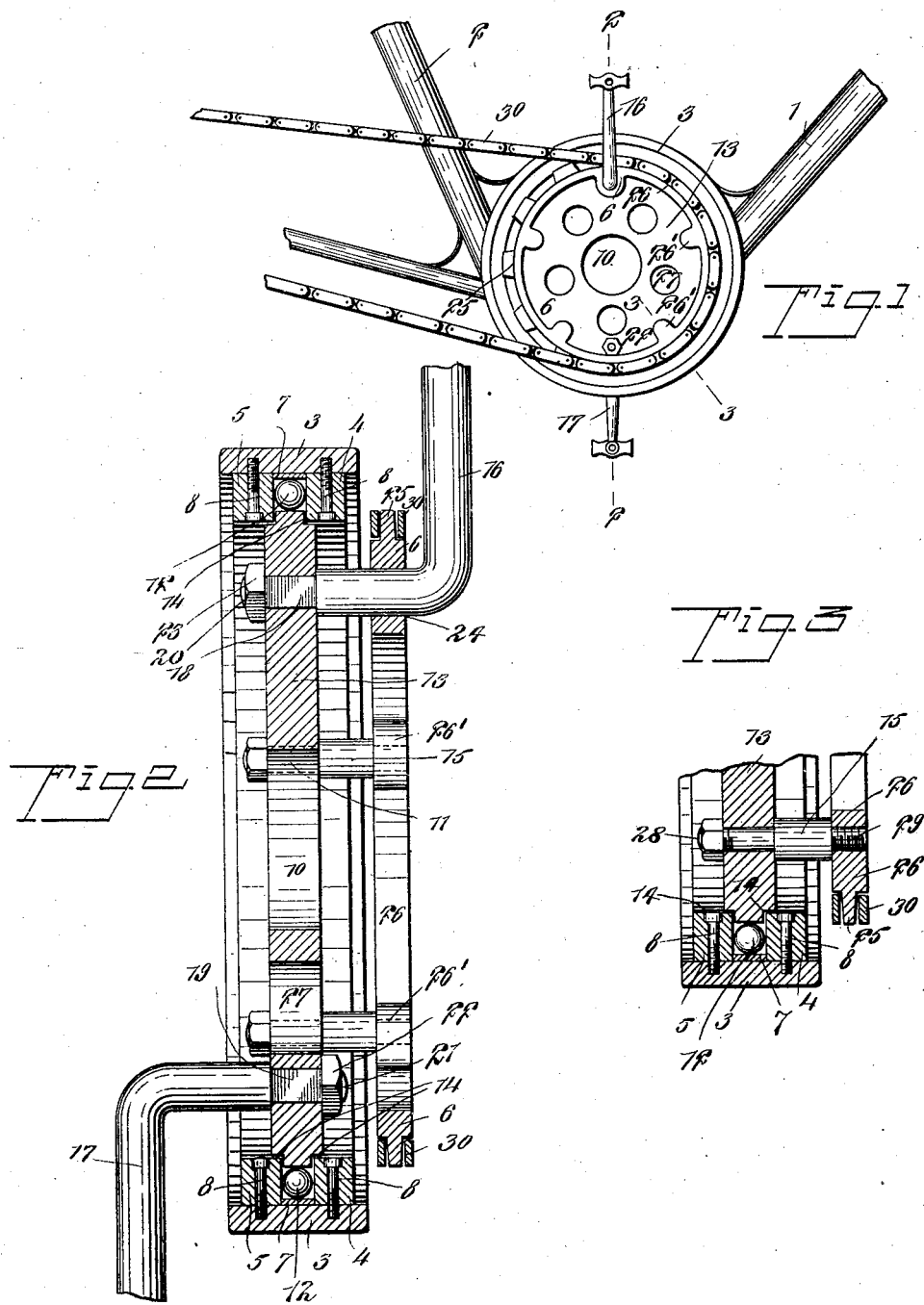
WITNESSES:
INVENTOR
Gideon Spence
BY
ATTORNEYS

UNITED STATES PATENT OFFICE.

GIDEON SPENCE, OF NEWPORT, RHODE ISLAND.

BICYCLE SPROCKET AND CRANK.

SPECIFICATION forming part of Letters Patent No. 709,934, dated September 30, 1902.

Application filed July 18, 1901. Serial No. 68,773. (No model.)

*To all whom it may concern:*

Be it known that I, GIDEON SPENCE, a citizen of the United States, and a resident of Newport, in the county of Newport and State of Rhode Island, have invented a new and Improved Bicycle Sprocket and Crank, of which the following is a full, clear, and exact description.

My invention relates to an improved sprocket and crank secured thereto, more particularly for use upon cycles of various kinds.

Reference is to be had to the accompanying drawings, forming a part of this specification, in which similar characters of reference indicate corresponding parts in all the figures.

Figure 1 is a fragmentary elevation of certain portions of a bicycle, showing my improved device as applied thereto. Fig. 2 is an enlarged section upon the line 2 2 of Fig. 1, and Fig. 3 is a fragmentary section upon the line 3 3 of Fig. 1.

An annular hollow casing 3 is secured upon the frame 1 2, so as to be rigid and practically integral therewith. Within the casing are rigidly mounted two rings 4 5, which are secured to the casing by means of screws 8, as is shown more particularly in Figs. 2 and 3. Between the rigid rings is a narrow band 7, which acts as a tread for the balls 12 and is removable from the casing, so that it can be readily replaced when worn out. The two rings and the narrow band together constitute one member of a ball-race, in which the balls 12 are loosely placed.

Within the casing there is a disk comprising a web 13, which is cut away slightly at its edge, so as to form shoulders 14, whereby the disk is practically rendered thinner at its edge. The thin portion projects into the hollow space between the rings 4 5, and by means of the shoulders 14 the disk is prevented from entering very far between the rings. The extreme outer edge of the disk constitutes the other member of the ball-race, so that the two rings and the band form virtually one member of a ball-bearing, the mutilated edge of the disk forming the other member thereof. As the casing and its rings are stationary and the disk is movable, it will be seen that the disk can readily be rotated in the casing, the friction being lessened by means of the ball-bearing. For the sake of lightness the web of the disk is provided with a large central aperture 10 and several smaller apertures 27.

Parallel with the disk and secured thereto by means of spaced bolts 15, secured by nuts 28, is the sprocket proper, consisting of a ring 26, provided upon its circumference with teeth 25 of the usual pattern. This sprocket-ring of course revolves at the same rate of speed as the disk. It is provided with heads 26' for more effective engagement of the bolts, which engage therein by means of threads 29.

Two cranks 16 and 17, which are squared at 18 and 19 and also threaded at 20 and 21, are secured to the disk by means of nuts 22 and 23, the crank 16 passing through an aperture 24 in the lug 6 of the sprocket-ring and constituting one of the fastenings for holding together the sprocket-ring and the disk, the other fastenings being the bolts referred to.

The operation of my invention is as follows: The cranks being caused to revolve in the usual manner, the angular portions 18 and 19 prevent any relative movement between the cranks and the disk, and of course the disk is forced to rotate. It runs freely upon the balls 12 and carries with it the parallel sprocket-ring, by which the sprocket-chain 30 is actuated in the usual manner. When the band 7 is worn out, the ring 5 is taken out, a new band put in, and the ring 5 replaced. By passing the inner portion of the crank directly through the aperture 24 in the sprocket the weight of one bolt is saved, and the crank serves not only as a means of propelling the sprocket, but likewise as a fastening for securing the disk and the sprocket together. The cranks can be readily detached at any time by merely loosening the nuts 22 23, and the sprocket can be removed by taking off the crank 16 and unscrewing the nut 28. It will therefore be seen that my device is a neat and compact structure which can be cheaply made and is not liable to get out of order. The disk, which runs upon the balls, is located centrally between the points where the power is applied, and yet at the same time the sprocket is at one side and in alinement with the rear sprocket, connected thereto in the usual manner, so that while the alinement is upon the side yet the wear is in the center of the machine.

Having thus fully described my invention, I claim as new and desire to secure by Letters Patent—

1. A cycle-sprocket, comprising a central stationary casing, a revoluble disk mounted centrally within the same and provided with an angular aperture, a sprocket-ring connected with said disk and spaced asunder therefrom for the purpose of alinement with another sprocket, and a crank-arm provided with an angular portion for engaging the said angular aperture of the disk, said crank-arm serving the double purpose of securing said disk and sprocket together and of causing the same to rotate.

2. A cycle-sprocket, comprising a fixed annular casing provided with a raceway, a revoluble disk provided with a comparatively thin edge for entering said raceway and with shouldered edges and also provided with angular apertures for engaging crank members, rolling bodies located in said raceway and engageable by said disk, a sprocket-ring connected to said disk and spaced apart therefrom, and crank members connected with said disk for rotating the same, one of said crank members passing through the sprocket-ring and constituting a fastening between the same and said disk.

3. A cycle-sprocket comprising a revoluble disk provided with an aperture, a sprocket-ring also provided with an aperture, cylindrical bolts detachably engaging said revoluble disk and said sprocket-ring for the purpose of removably securing said disk and sprocket-ring together, and of spacing said parts asunder, and a crank-arm extending through said aperture in said sprocket-ring and engaging said aperture in said disk, thus serving as an additional fastening for securing said disk and said sprocket-ring together, and also serving to rotate said parts.

In testimony whereof I have signed my name to this specification in the presence of two subscribing witnesses.

GIDEON SPENCE.

Witnesses:
MARY I. SPENCE,
QUINTINA THOMAS.